J. B. WIARD.
DYNAMO ELECTRIC MACHINE.
APPLICATION FILED APR. 27, 1910.

977,768.

Patented Dec. 6, 1910.

WITNESSES:
Irving E. Steers
J. Ellis Glen

INVENTOR.
JOHN B. WIARD.
BY Albert G. Davis
HIS ATTORNEY.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

977,768.  Specification of Letters Patent.  Patented Dec. 6, 1910.

Application filed April 27, 1910. Serial No. 557,849.

*To all whom it may concern:*

Be it known that I, JOHN B. WIARD, a citizen of the United States, residing at Lynn, county of Essex, State of Massachusetts, have invented certain new and useful Improvements in Dynamo-Electric Machines, of which the following is a specification.

My invention relates to dynamo electric machines and more particularly to an arrangement for keeping such machines cool.

In dynamo electric machines, which are totally inclosed so that they may be used where it is desirable not to have any communication between the interior of the machine and the surrounding medium, as for instance, motors used in the driving of cotton mills, it is difficult to dissipate the heat generated, so as to keep down the temperature of the machine.

It is the object of my invention to provide an arrangement whereby the machines are cooled by a circulation of a cooling fluid. The maximum cooling effect can be obtained when the cooling fluid flows directly through the parts in which the heat is developed.

To this end, my invention consists in providing a plurality of holes through the stationary core structure for receiving the cooling fluid, which holes register with grooves in the end frames between which the core structure is clamped, channels being provided in the end frames for connecting the grooves to the exterior of said end frames, one of the channels being an inlet and the other an outlet for the cooling fluid.

Other features of novelty which characterize my invention are pointed out with particularity in the claims annexed to and forming a part of this specification.

For a better understanding of my invention, reference may be had to the following description taken in connection with the accompanying drawing in which—

Figure 2:
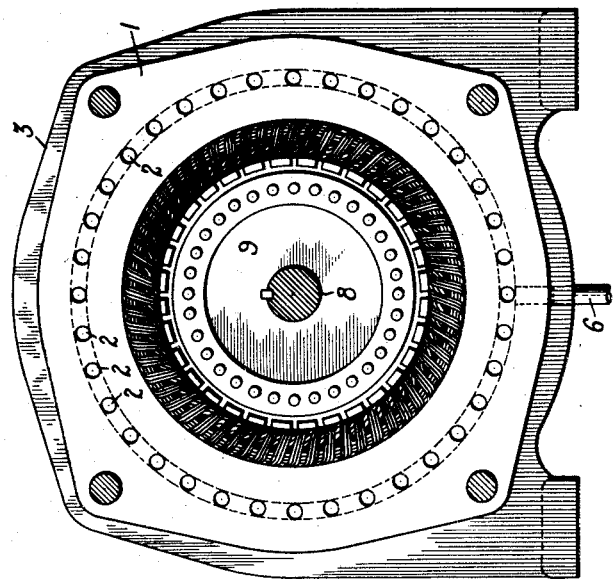
Figure 1:
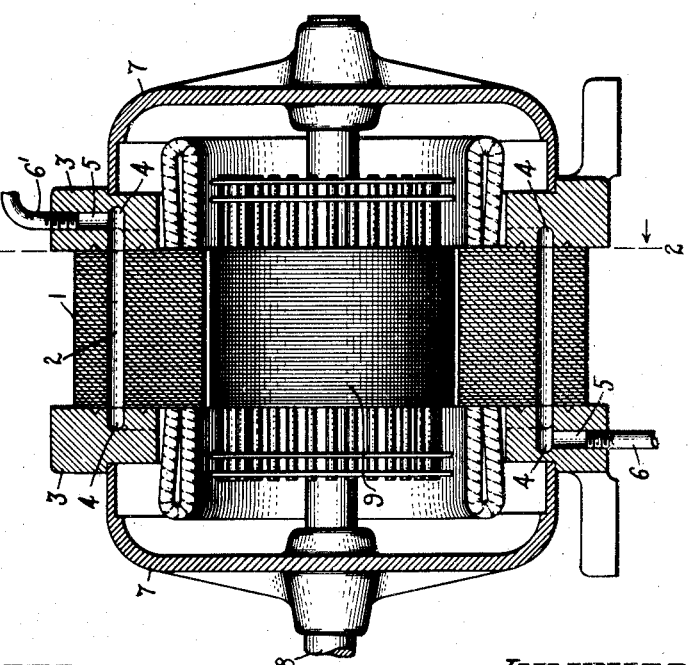

Figure 1 is a sectional view of a dynamo electric machine embodying my invention, and Fig. 2 is a sectional view of the machine of Fig. 1 taken on the line 2—2 and looking in the direction of the arrows.

Referring to the drawing, the stationary core structure is built up of laminations 1 having holes 2 extending therethrough for receiving the cooling fluid. These holes are preferably arranged in a circle. The laminations 1 are clamped between end frames 3, each of which has a circular groove 4 registering with the holes 2 and a channel 5 connecting the groove to the exterior of the end frame. In the ends of the channels are secured pipes 6 and 6'. The pipe 6 is the inlet and the pipe 6' is the outlet for the cooling fluid. I preferably coat or cover the interior walls of the holes 2 with paint, japan, or other suitable material so that the cooling fluid will not leak out between the laminations. The holes are coated whenever the pressure under which the laminations are assembled and fastened to the end frames is not sufficient to make the laminations into such a compact mass that the cooling fluid will not leak out between them. Bonnets 7, in which the armature shaft 8 is journaled, are fastened to the end frames 3 and form with the stationary core a totally inclosed structure within which the rotor or armature 9, mounted on the shaft 8, rotates.

The cooling fluid enters the machine at the bottom through the inlet pipe 6, flows through one of the channels 5, groove 4, then through the holes 2, into the other groove 4, channel 5 and out of the outlet pipe 6' at the top of the machine. The cooling fluid will run off from the outlet pipe by gravity, and thus it will not be necessary to have the cooling fluid in the machine at a pressure greater than a few pounds.

When a machine in accordance with my invention is used in the spinning room of a cotton mill, which is necessarily extremely damp and quite warm, the pipe conveying the cooling fluid to the inlet pipe 6, will condense moisture if this pipe is much colder than the room. The condensed moisture will drip off the pipe and may cause a great deal of damage to apparatus, such as spinning frames. Instead of using cold fluid for cooling the machines, I may, therefore, artificially heat the fluid to approximately the room temperature by any suitable method, and since the permissible temperature of the machine is considerably above room temperature, it will not be necessary to supply much additional fluid to compensate for the heating of the fluid before it is supplied to the machine.

It will of course be understood that while the arrangement of parts illustrated and described in detail forms a preferred embodiment of my invention, the invention is not limited to this particular embodiment, and I aim in the appended claims to cover all modifications which do not depart from the spirit and scope of my invention.

What, I claim as new and desire to secure by Letters Patent of the United States, is,—

1. In a dynamo electric machine, a stationary core structure having a plurality of holes extending therethrough for receiving a cooling fluid, and end frames clamping said core structure, each of said end frames having a groove registering with said holes and a channel connecting said groove to the exterior of said end frame.

2. In a dynamo electric machine, a stationary core structure having a plurality of holes extending therethrough for receiving a cooling fluid and arranged in a circle, and end frames clamping said core structure, each of said end frames having a circular groove registering with said holes and a channel connecting said groove to the exterior of said end frame.

3. In a dynamo electric machine, a stationary laminated core structure having a plurality of holes extending therethrough for receiving a cooling fluid, the interior walls of said holes being coated or covered so that cooling fluid will not leak out between the laminations, and end frames clamping said core structure, each of said end frames having a groove registering with said holes and a channel connecting said groove to the exterior of said end frame.

4. In a dynamo electric machine, a stationary laminated core structure having a plurality of holes extending therethrough for receiving a cooling fluid arranged in a circle, the interior walls of said holes being coated or covered so that cooling fluid will not leak out between the laminations, and end frames clamping said core structure, each of said end frames having a circular groove registering with said holes and a channel connecting said groove to the exterior of said end frame.

In witness whereof, I have hereunto set my hand this 25th day of April, 1910.

JOHN B. WIARD.

Witnesses:
 JOHN A. MCMANUS, Jr.,
 CHARLES A. BARNARD.